(12) United States Patent
Marlow et al.

(10) Patent No.: US 8,943,541 B2
(45) Date of Patent: Jan. 27, 2015

(54) HOLOGRAPHIC 3D DISPLAY

(75) Inventors: Stewart Marlow, West Yorkshire (GB);
Matthew Lewis, West Yorkshire (GB);
Andrew Johnson, North Yorkshire (GB)

(73) Assignee: Eldon Technology Limited, Steeton (GB)

( * ) Notice: Subject to any disclaimer, the term of this patent is extended or adjusted under 35 U.S.C. 154(b) by 499 days.

(21) Appl. No.: 12/901,849

(22) Filed: Oct. 11, 2010

(65) Prior Publication Data

US 2012/0090005 A1 Apr. 12, 2012

(51) Int. Cl.
*H04N 5/445* (2011.01)
*H04N 21/81* (2011.01)
*H04N 21/482* (2011.01)
*G06Q 30/02* (2012.01)
*H04N 21/262* (2011.01)
*H04N 21/41* (2011.01)
*H04N 21/433* (2011.01)
*H04N 7/16* (2011.01)
*H04N 7/10* (2006.01)

(52) U.S. Cl.
CPC ......... *H04N 21/8146* (2013.01); *H04N 21/482* (2013.01); *G06Q 30/0241* (2013.01); *H04N 21/26283* (2013.01); *H04N 21/4122* (2013.01); *H04N 21/4331* (2013.01); *H04N 21/812* (2013.01); *H04N 21/816* (2013.01)
USPC .................. 725/46; 725/32; 725/52; 725/153

(58) Field of Classification Search
None
See application file for complete search history.

(56) References Cited

U.S. PATENT DOCUMENTS

| 5,973,807 | A | 10/1999 | Buchkremer et al. |
| 6,976,228 | B2 * | 12/2005 | Bernhardson ................. 715/830 |
| 7,581,182 | B1 | 8/2009 | Herz |
| 2002/0111204 | A1 * | 8/2002 | Lupo ................................ 463/9 |
| 2005/0108751 | A1 * | 5/2005 | Dacosta .......................... 725/39 |
| 2007/0236585 | A1 | 10/2007 | Ryckman |
| 2010/0262995 | A1 * | 10/2010 | Woods et al. .................... 725/40 |
| 2011/0128555 | A1 * | 6/2011 | Rotschild et al. ............. 356/625 |
| 2011/0164032 | A1 * | 7/2011 | Shadmi ......................... 345/419 |
| 2012/0200495 | A1 * | 8/2012 | Johansson ..................... 345/156 |

FOREIGN PATENT DOCUMENTS

| CA | 2347000 A1 | 1/2002 |
| WO | 2008016611 A2 | 2/2008 |

OTHER PUBLICATIONS

ISA IB, International Search Report for Application No. PCT/IB2011/002725, dated Apr. 10, 2012.
Canadian Intellectual Property Office, Office Action, dated Jul. 25, 2014 for Canadian Patent Application No. 2,814,130.

* cited by examiner

*Primary Examiner* — Chris Parry
(74) *Attorney, Agent, or Firm* — Ingrassia Fisher & Lorenz, P.C.

(57) ABSTRACT

Systems and methods are provided for projecting holographic images in connection with a program service such as cable or satellite television. In one instance, the projected holographic image may be an image of product that is featured in advertisement or other portion of program service. In another instance, the projected holographic image may be an image of an electronic programming guide with screens or menu displayed on sides of a cube or other geometric form. In still another instance, the projected holographic image is a video that supplements an instructional video or live broadcast.

5 Claims, 8 Drawing Sheets

HOLOGRAPHIC 3D DISPLAY

TECHNICAL FIELD

Embodiments discussed herein are directed to projecting holographic images in connection with a program service such as cable or satellite television.

BACKGROUND

Program services such as cable and satellite television may be displayed on a television, a monitor, or other display device that features a flat display surface that typically outputs two-dimensional video. The typical two-dimensional video may be unable to display some features of three dimensional objects such as depth or the ability to view the object from a variety of angles. Due to these limitations, displayed objects may lack a realistic appearance. Accordingly, it may be desirable to display program service content or video that supplements program service in a manner that does not suffer from the drawbacks of traditional display formats.

SUMMARY

Embodiments discussed herein are directed to projecting holographic images in connection with a program service such as cable or satellite television. In one instance, the projected holographic image may be an image of product that is featured in advertisement or other portion of program service. In another instance, the projected holographic image may be an image of a electronic programming guide with screens or menu displayed on sides of a cube or other geometric form. In still another instance, the projected holographic image is a video that supplements an instructional video or live broadcast.

One embodiment is directed to a method for providing an advertisement image, comprising: receiving a program service transmission at a receiver, the program service transmission having a plurality of channels; outputting at least one channel of the plurality of channels from the receiver for display on a display device, wherein the at least one channel includes a display of a product; and concurrently with the display of the at least one product, outputting a holographic image of the product.

Another embodiment is directed to a method for providing an electronic programming guide, comprising: receiving a program service transmission at a receiver, the program service transmission having a plurality of channels; outputting at least one channel of the plurality of channels from the receiver for display on a display device; and concurrently with the display of the at least one channel, outputting a holographic image of an electronic programming guide, the holographic image including at least a first menu and a second menu.

Yet another embodiment is directed to a method for supplementing program service content, comprising: receiving a program service transmission at a receiver, the program service transmission having a plurality of channels; outputting at least one channel of the plurality of channels from the receiver for display on a display device, the at least one channel including a program; and concurrently with outputting the at least one channel, outputting a holographic video related the program.

Another embodiment is directed to a system for displaying a holographic image, comprising: a signal receiver configured to receive a program service transmission, the program service transmission having a plurality of channels; an output section connected to the signal receiver, the output section configured to output a signal having at least one channel of the plurality of channels from the program service transmission for display on a display device, the at least one channel including a program; and a holographic projector connected to the output section, the holographic projector configured to output a holographic video in combination with the program.

DETAILED DESCRIPTION

Embodiments discussed herein are directed to projecting holographic images in connection with a program service such as cable or satellite television. In one instance, the projected holographic image may be an image of product that is featured in advertisement or other portion of program service. In another instance, the projected holographic image may be an image of a electronic programming guide with screens or menu displayed on sides of a cube or other geometric form. In still another instance, the projected holographic image is a video that supplements an instructional video or live broadcast.

As used herein, a "receiver" may be any device capable of receiving video and/or audio content included in a broadcast or other program service transmission from a service provider. As used herein, a service provider may include any service that provides a program service transmission to a receiver such as, without limitation, a satellite television service, a direct television service, a cable television service, or a streaming video delivered across a network such as the Internet. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Figure 1:
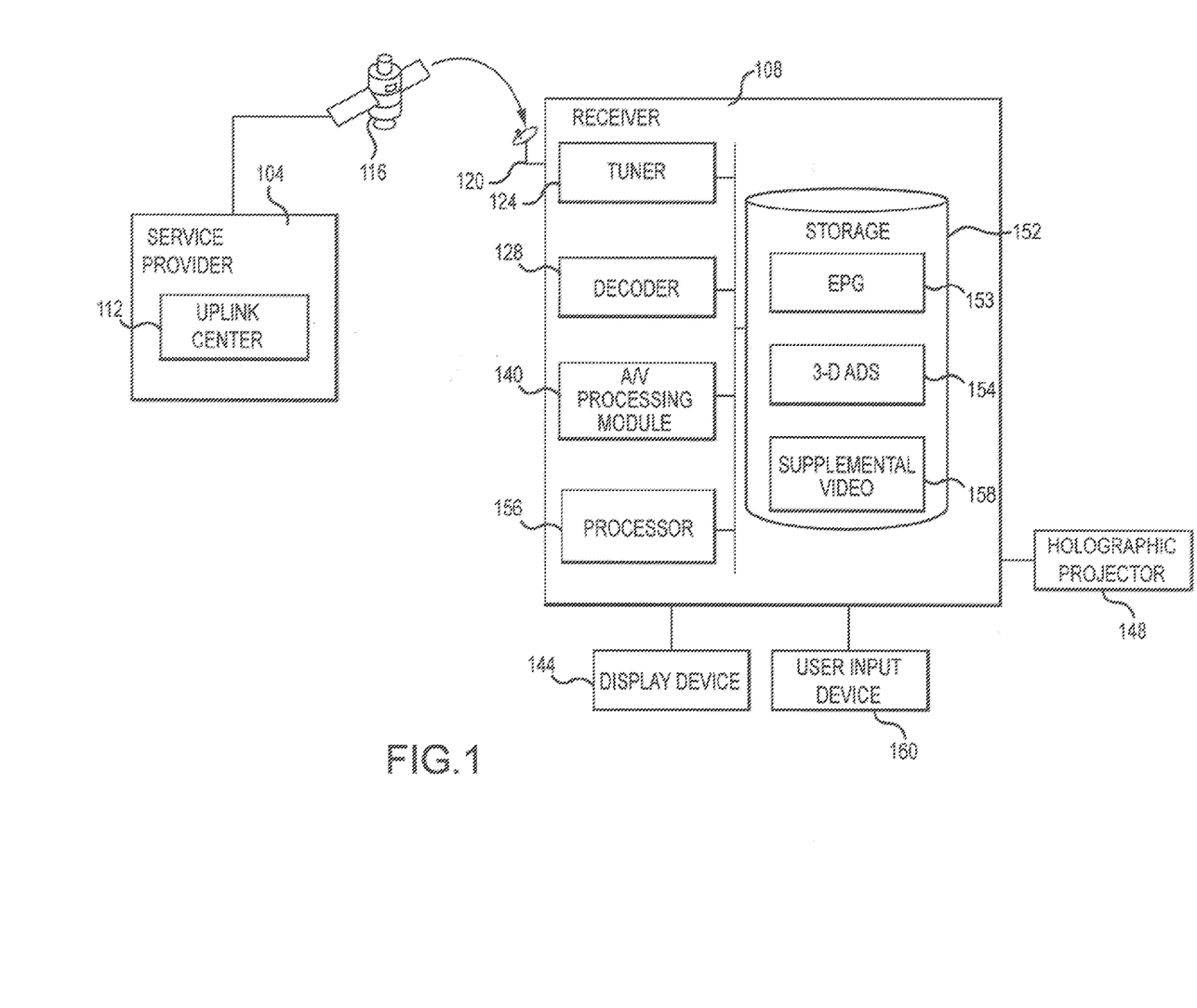
FIG. 1 is a schematic diagram showing a sample system, components and implementations discussed herein.

FIG. 1 is a schematic illustration of a general operating environment showing components and features of embodiments discussed herein. FIG. 1 depicts a service provider 104 that transmits or otherwise provides a program service transmission to a receiver 108. The receiver 108 can include a set-top box (STB), a digital video recorder (DVR), a cable receiver, a general purpose computing device, a handheld communications device including but not limited to a table computer or a mobile phone, and so on. A receiver 108 may also include a cable modem that receives streaming audio. The receiver 108 may be associated with an individual, business or other entity, user or subscriber that receives a program service transmission from the service provider 104. Generally the terms "user" and/or "subscriber" refer to an individual or company who receives a program service transmission. This may include those who have purchased a subscription to the program service transmission. Alternatively or additionally, the terms "user" and/or "subscriber" may refer to individuals who have been given access to the program service transmission through promotional offers and/or other non-fee-based agreements.

In connection with embodiments that operate in the context of a satellite television service, the service provider 104 may provide a program service transmission through an uplink center 112. Implementations discussed herein may utilize a direct broadcast satellite (DBS) system which can incorporate packetized transmission signals according to an appropriate standard, such as the MPEG-2 and/or MPEG-4 standards. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The retransmitted signal may be received from the satellite 116 at one or more satellite dishes 120, which are typically associated with one or more receivers 108. A receiver 108 may include a tuner 124 operable to receive the program service transmission signal through the satellite dish 120 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (A/V) processing module 140. The A/V processing module 140 may process the video and audio streams using digital-to-analog conversion techniques, or compressed digital to uncompressed digital conversion techniques, to produce one or more output signals. It should be appreciated that the foregoing is but one discussion of a possible embodiment and product transmission service.

As shown in FIG. 1, the receiver 108 may be provided in association with a holographic projector 148. The holographic projector 148 may be implemented as a stand-alone device. In accordance with other embodiments, the holographic projector 148 may be integrated as a component of the receiver 108. The holographic projector 148 is operable to project a three-dimensional image or video that may be seen by a viewer without the aid of 3D glasses or other headgear. The holographic projector 148 may operate by projecting a volumetric image into a volume which contains suspended particles or other means for reflecting light. In one embodiment, the holographic projector 148 may be a spherical, cylindrical, cubic or other three-dimensional liquid crystal display (LCD) that presents a three-dimensional image with multiple depths of layers having different or dynamic translucence. The individual layers may be controlled to emphasize certain aspects of an image that the producer of the image wants to be in focus. The spherical LCD or other holographic projector 148 may project several views simultaneously so that different users see different perspectives simultaneously. Also, the position of the user's view may vary as he or she move around the screen or projected image. The holographic projector 148 may also include a high brightness display so that the projected image is still viewable in high sunlight conditions. The holographic projector 148 may be mounted in a household object such as a coffee table, such that the three-dimensional image appears to project upwards from the surface of the table. The holographic projector may also be mounted in other locations such as a ceiling or a wall.

As another option, the holographic projector may consist of multiple lasers operably connected to a modulator. The modulator may accept an incoming video signal and convert the signal to a vibrational pattern. As light from the lasers pass through the modulator, the vibrations of the modulator may affect the brightness and/or frequency of the emitted light. Light passing through the modulator may be projected onto a screen; the varying intensities and frequencies of light modified by the vibrational pattern of the modulator may cooperate to form a hologram. The screen may be thicker than a typical LCD display and may be translucent in order to display the hologram. Thus, the screen may show the light as a three-dimensional image appearing to be inside the screen. Other embodiments may use different methods for creating a diffraction pattern that may be used to create a hologram in or on an appropriate surface.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet.

The receiver 108 may include or be associated with a memory or other storage device 152, such as magnetic or optical storage. The storage device 152 may be operable to store data received from the decoded satellite signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable in nature. The stored data set may include audio and/or visual content to be transmitted and output through the output device 144. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 156 operable to run executable code in connection with various functions associated with the receiver 108. For example, the processor 156 may display graphics, images, animations or other content through the output device 144. The storage device 152 may store an application, file, or other data that is useable by the processor 156. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156.

The processor 156 may also perform such tasks as executing commands received from a user. As used herein, a "user input device" may include any device operable to receive input from a user and to convey the input to the receiver 108. In one embodiment, the user input device 160 may be a hand-held device having a number of buttons or keys that when actuated by a user cause the user input device to covey information to the receiver 108 using a suitable communication means, such as an infrared signal. The user input device 160 may include a pointing device or functionality that allows the user to control the position of a cursor that is displayed on the output device 144. For example, the user input device 160 may include a track ball or glide plane that may be manipulated to control cursor movements. The user input device 160 may include a motion sensor or accelerometer that allows a user to control displayed items or graphics, such as a cursor, through movements of his or her hand or arm that cause a displacement of the user input device 160. It should be appreciated that other input devices such as a computer mouse or touch screen may be used and other communication means, wired or wireless, may be used.

In one embodiment, the storage device 152 may be used to store a file or other data to produce a holographic electronic programming guide (EPG) 153. When displayed by the holographic projector 148, the EPG data may be set out in a grid, cube, cylinder or other appropriate format and displayed on a surface or surfaces of the three-dimensional image of a geometric form such as a cube. The data for the EPG may include a program schedule having program channels and program times arranged as rows and columns of the grid. The EPG data may be downloaded to the receiver 108 at appropriate times from the service provider 104. The storage device 158 may also be used to store a file or data to produce a holographic image of product featured in an advertisement 154. The three-dimensional holographic ad 154 may be sent to the receiver 108 in connection with products that are shown during a program or a program service advertisement. The three-dimensional holographic advertisement 154 may be stored or saved in response to user input so that the holographic advertisement 154 may be viewed at a latte time. Additionally, the storage device 152 may be used to store supplemental video 158 that may be shown by the holographic projector 148 in connection with other programs such as instructional videos and live sporting events.

Figure 2:
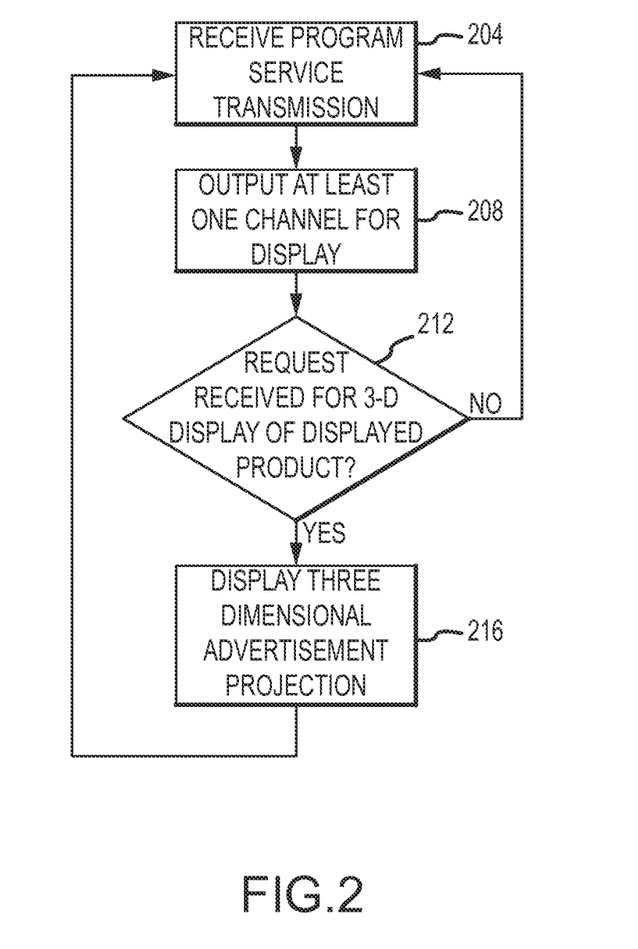
FIG. 2 is a flow chart that illustrates a method in accordance with embodiments discussed herein.

FIG. 2 is a flowchart illustrating a method in accordance with embodiments discussed herein. The method illustrated in FIG. 2 is directed to providing a holographic advertisement. Initially, in operation 204, the receiver 108 receives a program service transmission. As described above, this may include receiving a signal from a service provider and processing that signal through various steps such as tuning, demodulating, de-multiplexing, and so on. Following operation 204, operation 208 may be executed. In operation 208, the receiver 108 may output at least one channel for display on a display device 144. As described above, this may include processing one channel from the plurality of channels received within the program service transmission. Following operation 208, operation 212 may be executed.

In operation 212, the receiver 108 determines if a request has been received for display of a holographic advertisement. Specifically, the program service channel displayed in operation 208 may include one or more products. Products included in the display may be, for example, cars, motorcycles, boats, and so on. The products may be featured in an advertisement that specifically targets the selling of the displayed product. In other instances, the product may be featured in a movie, television program, in a "product placement" manner. In connection with displaying the product, the receiver 108 may output a signal containing a prompt or popup that may be selected by the user to trigger the display of a holographic advertisement. Accordingly, in operation 212, if no such trigger is received by the receiver 108, operation 204 may again be executed such that the receiver 108 continues to a receive program service transmission and to display channels in association with the received transmission. If, in operation 212, a request for a holographic advertisement has been received, operation 216 may be executed.

Figure 3:
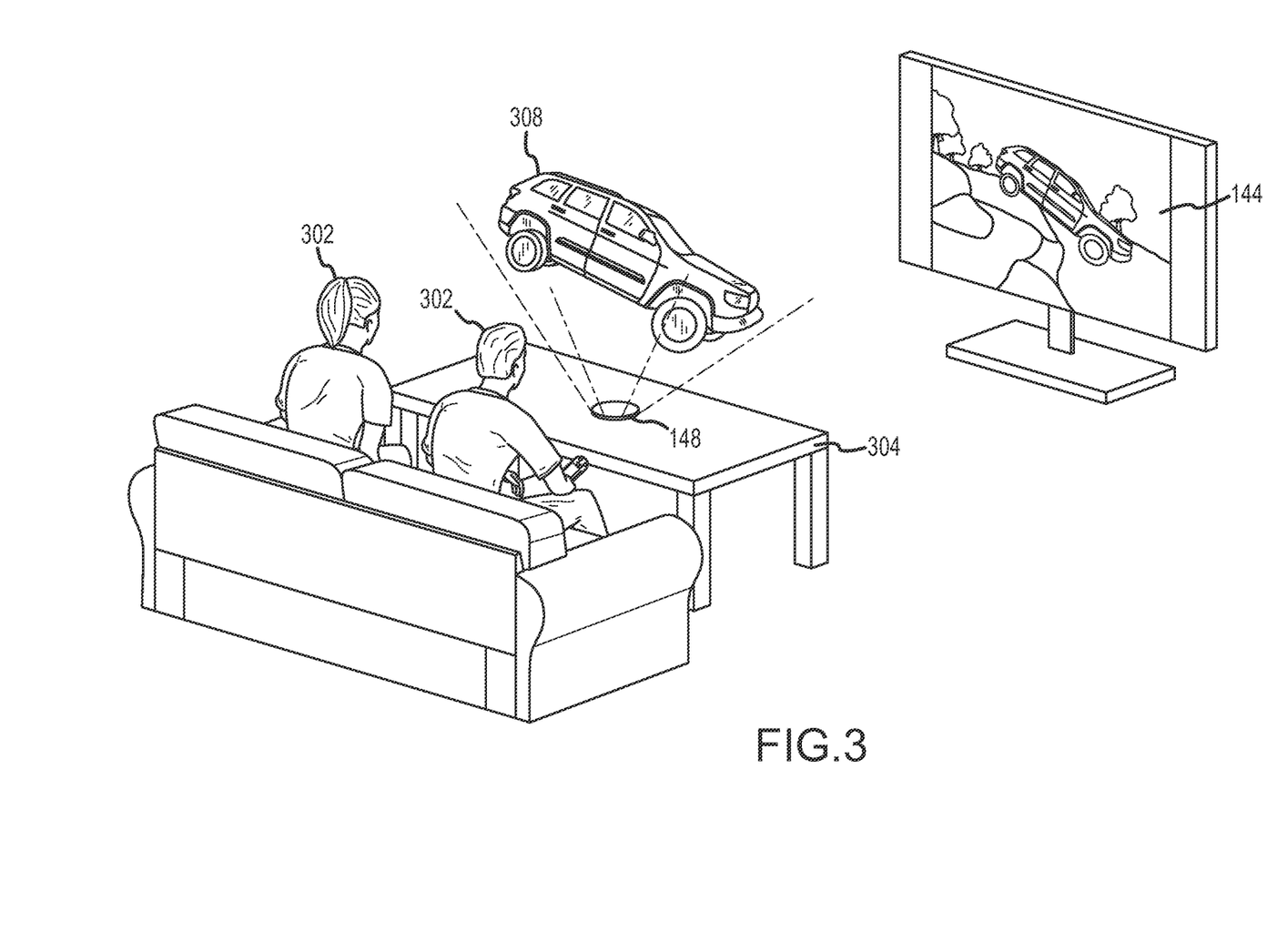
FIG. 3 is an illustration a holographic projection in accordance with the method illustrated in FIG. 2.

In operation 216, the receiver 108 may display a three-dimensional advertisement as a holographic projection. Operation 216 is illustrated in detail in FIG. 3. FIG. 3 is an illustration of a viewing environment for a holographic advertisement. FIG. 3 includes a display device 144 and a holographic projector 148. As shown in FIG. 3, the holographic projector 148 is mounted or otherwise associated with a table 304. The table 304 is positioned in front of users 302 who are currently viewing the display device 144. As shown in FIG. 3, the display device 144 features a representation of an automobile. In response to a request for a holographic advertisement from the users 302, the holographic projector 148 may display a three-dimensional holographic projection 308 of the automobile featured on the display device 144. The holographic projection 308 allows the user to view a three-dimensional image of the product to thereby gain greater appreciation for the features and appearance of the product. The three-dimensional projection 308 may be rotatable or otherwise orientable through various inputs provided through the user input device 160. In some instances, the image 308 may automatically rotate or change positions in order to show various sides or angles to the users 302. In other instances, the three-dimensional image 308 remains stationary. It should be appreciated that in these instances, a user 302 may position himself in various locations around the image 308 to view the various angles that are made visible by the holographic projection 308.

In accordance with implementations discussed herein, once the user has finished viewing the three-dimensional holographic projection 308 the user may choose to store a file used to project the image 308 in storage 152. In this manner the image may be recalled and again projected for viewing by users 302. In the instance wherein a user is shopping for an automobile, several such files may be collected and later displayed in connection with comparison shopping for various automobiles.

The holographic projection 308 may be adapted to emphasize certain features of the product that are shown as projected images. For example, the holographic projection 308 may be a motion picture in which various features are emphasized over time. For example, the hood of the automobile may be opened to reveal the engine, the tires may be shown moving over a road to emphasize various features of the suspension system, or the interior of the car may be featured such that the user gets a full appreciation of features of the automobile.

Figure 4:
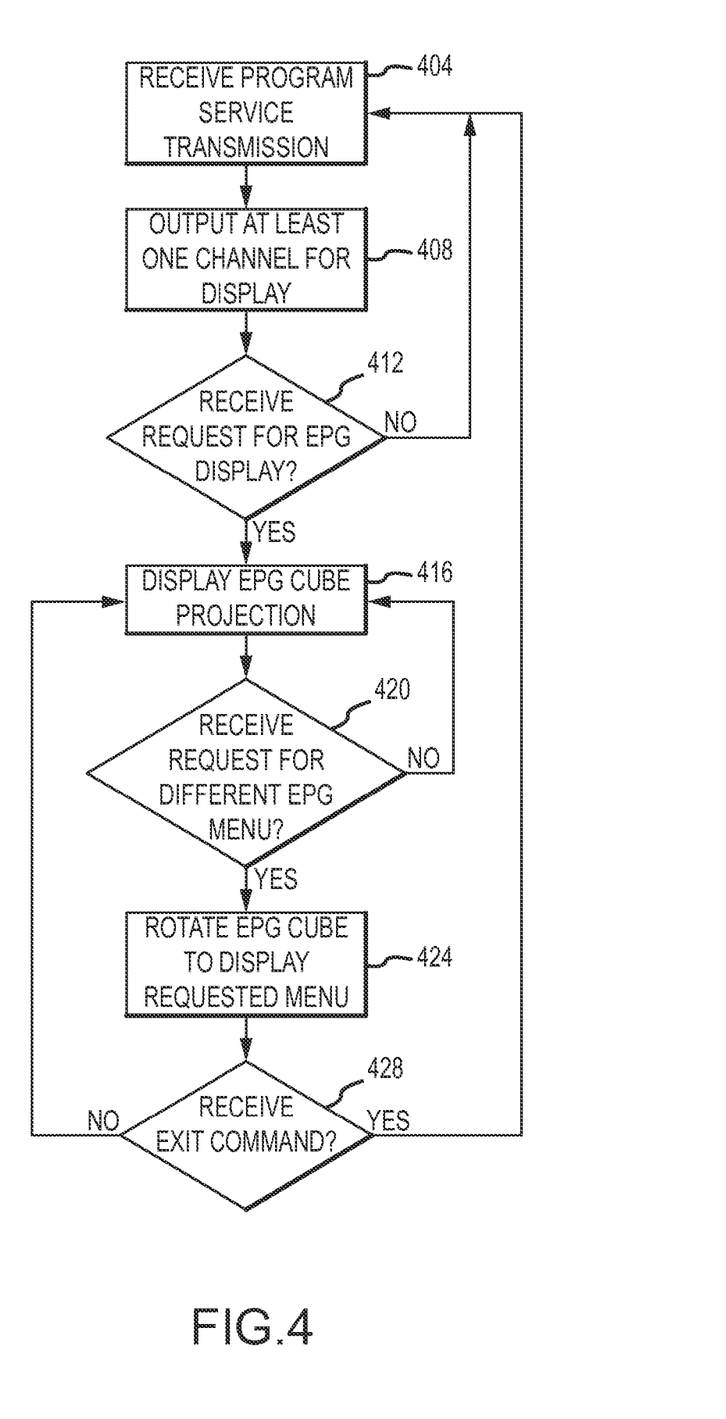
FIG. 4 is a flow chart that illustrates another method in accordance with embodiments discussed herein.

FIG. 4 is a flowchart that illustrates a method in accordance with implementations discussed herein. The method illustrated in FIG. 4 is directed to providing a three-dimensional holographic projection of an electronic programming guide (EPG). Initially, in operation 404, the receiver 108 receives a program service transmission. As described above, this may include receiving a signal from a service provider and processing that signal through various steps such as tuning, demodulating, de-multiplexing, and so on. Following operation 404, operation 408 may be executed. In operation 408, the receiver 108 may output at least one channel for display on a display device 144. As described above, this may include processing one channel from the plurality of channels received within the program service transmission. Following operation 408, operation 412 may be executed.

In operation 412, the receiver 108 determines if a request has been received for an EPG display. Such a request may be entered by a user through appropriate commands input to the user input device 160. If, in operation 412, the receiver 108 determines that no request has been received, operation 404 may again follow such that the receiver 108 continues to receive and display channels from a service provider 104. If, in operation 412, a request to view an EPG display has been received, operation 416 may be executed.

Figure 5:
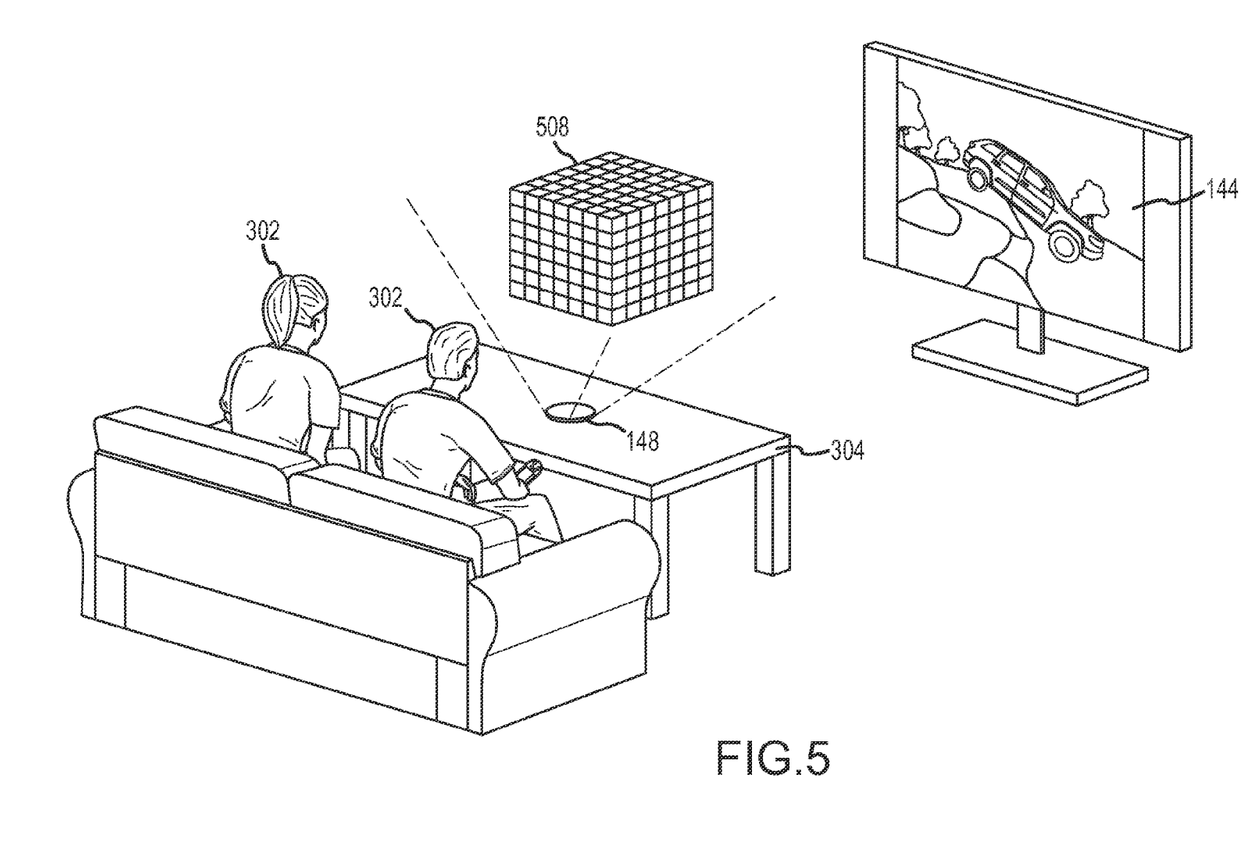
FIG. 5 is an illustration a holographic projection in accordance with the method illustrated in FIG. 4.

In operation 416, the receiver 108 outputs a signal having an EPG signal. The EPG signal may be configured to cause the holographic projector 148 to output a three-dimensional representation of an electronic programming guide. In one instance, this may include an "EPG Cube" that shows various menus on each side of the cube. An EPG cube is illustrated in greater detail in FIG. 5. As can be seen in FIG. 5, the projector 148 projects a cube or other three-dimensional object with a plurality of sides. Each side of the EPG cube 508 may include one or more menus associated with an electronic programming guide. For example, if one user 302 wishes to personalize his EPG such that his favorite channels and/or his upcoming scheduled programming appear in one display, such a personalized menu may appear on one side of the EPG cube 508. An additional side of the EPG cube 308 may be dedicated to a second user's 302 personalized EPG. By displaying a three-dimensional cube as shown in FIG. 5, each user may be able to simultaneously view his or her personalized EPG menu screens.

Referring again to FIG. 4, following operation 416, operation 420 may be executed. In operation 420, the receiver 108 determines if a request for a different EPG menu has been received. If, in operation 420, no request for a different EPG menu has been received, operation 416 may again be executed such that the display of the EPG cube is continued. If, in operation 420, a request to view a different EPG menu is received, operation 424 may be executed.

In operation 424, the receiver 108 may output an EPG signal to the holographic projector 148 that causes the EPG cube 508 to rotate in three-dimensional space such that the requested EPG menu is visible to a particular user 302. In this manner, the requested menu may be visible at a specific angle with respect to the displayed EPG cube 508 such that other previously viewed menus are still visible at other angles with respect to the displayed EPG cube 508. In this manner, one user 302 may be allowed to view his requested EPG menu while others positioned at different angles around the cube may still view other EPG menus, as appropriate.

Following operation 424, operation 428 may be executed. In operation 428, the receiver 108 determines if an exit command has been received that indicates that the EPG menu should be exited. If, in operation 428, no such exit command is received, operation 416 may be again executed such that the display of EPG cube 508 is continued. If, in operation 428, an exit command is received, operation 404 may again be executed such that the receiver 108 continues to receive, decode, and display a program service channel.

Figure 6:
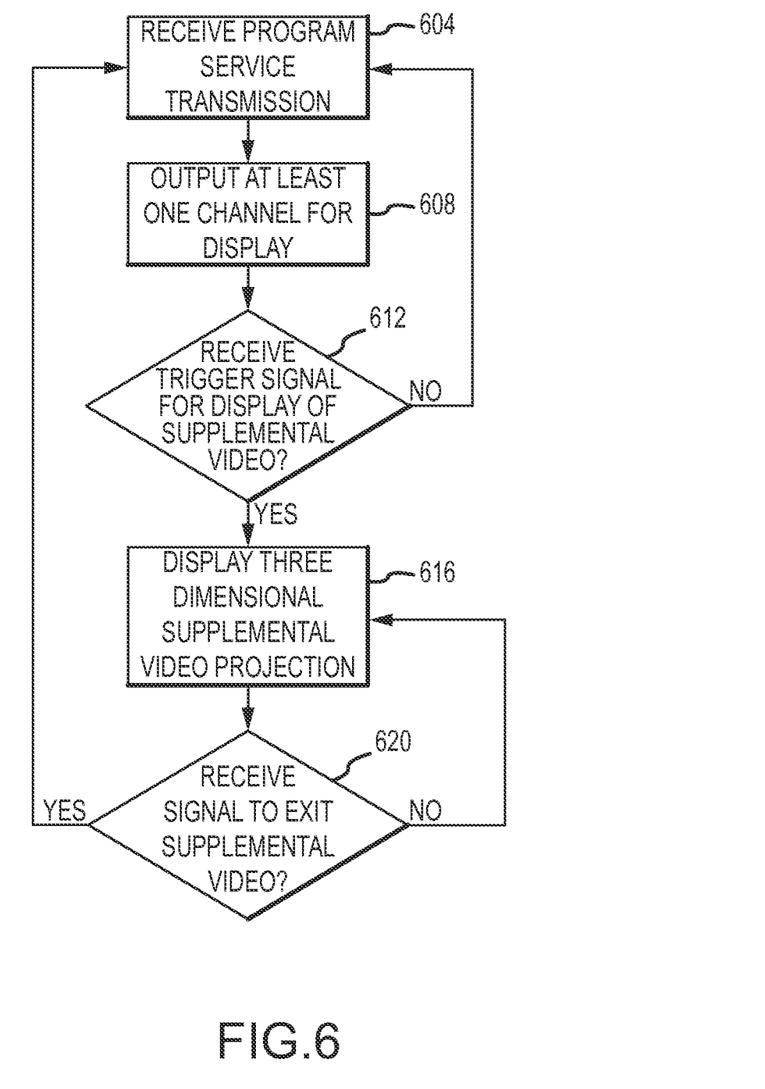
FIG. 6 is a flow chart that illustrates still another method in accordance with embodiments discussed herein.

FIG. 6 is a flowchart illustrating a method in accordance with embodiments discussed herein. The method illustrated in FIG. 6 is directed to providing a supplemental holographic video or image in connection with a program service transmission. Initially, in operation 604, the receiver 108 receives a program service transmission. As described above, this may include receiving a signal from a service provider and processing that signal through various steps such as tuning, demodulating, de-multiplexing, and so on. Following operation 604, operation 608 may be executed. In operation 608, the receiver 108 may output at least one channel for display on a display device 144. As described above, this may include processing one channel from the plurality of channels received within the program service transmission. Following operation 608, operation 612 may be executed.

In operation 612, the receiver 108 determines if a trigger signal has been received which indicates that an associated supplemental holographic projection is to be displayed. If no such trigger signal is received in operation 616, operation 604 may again be executed such program service channels are received, decoded, and displayed. If, in operation 616, a trigger signal is received, operation 616 may follow.

Figure 7:
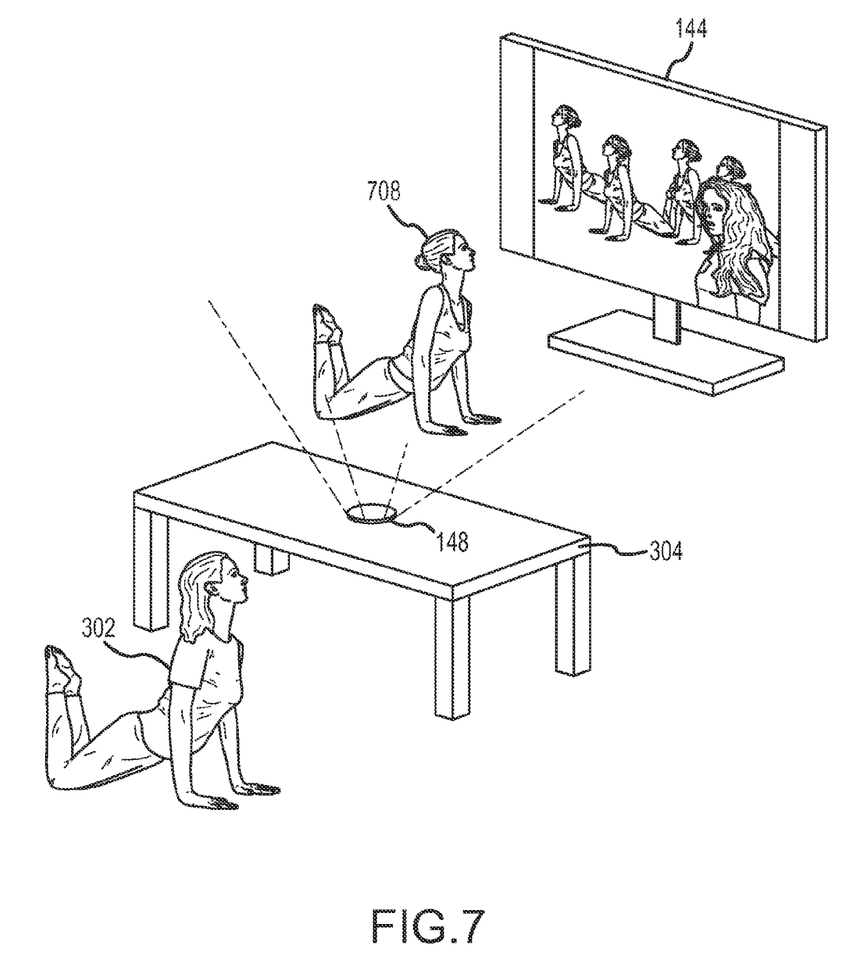
FIG. 7 is an illustration a holographic projection in accordance with the method illustrated in FIG. 6.

In operation 616, the receiver 108 may display a three-dimensional supplemental video projection. In one embodiment, supplemental holographic images or videos may be displayed in connection with instructional videos that are shown on the display device 144. An example of an instructional supplemental video is shown in FIG. 7. The instructional video in FIG. 7 is, by way of example, a video of a yoga class. As can be appreciated, many service providers offer instructional videos directed to fitness or exercise routines that allow a person to follow the instructions given and thereby benefit from a directed exercise class in their own home. As shown in FIG. 7, the user 302 has adopted a yoga posture in connection with watching the yoga instructional video shown on the display device 144. In this embodiment, the holographic projector 144 may be used at specific points in the instructional video to emphasize certain points or certain important aspects of a yoga sequence or technique. In this instance, the holographic projector 148 may display an image of a person who has adopted a particular yoga pose in a correct or otherwise instructional manner. The holographic projection 708 may be referred to and referenced by the instructor who is otherwise displayed on the two-dimensional display 144. Accordingly, the user 302 may view the three-dimensional projection 708 to ensure that his practice or other adoption of the yoga technique is correct.

Figure 8:
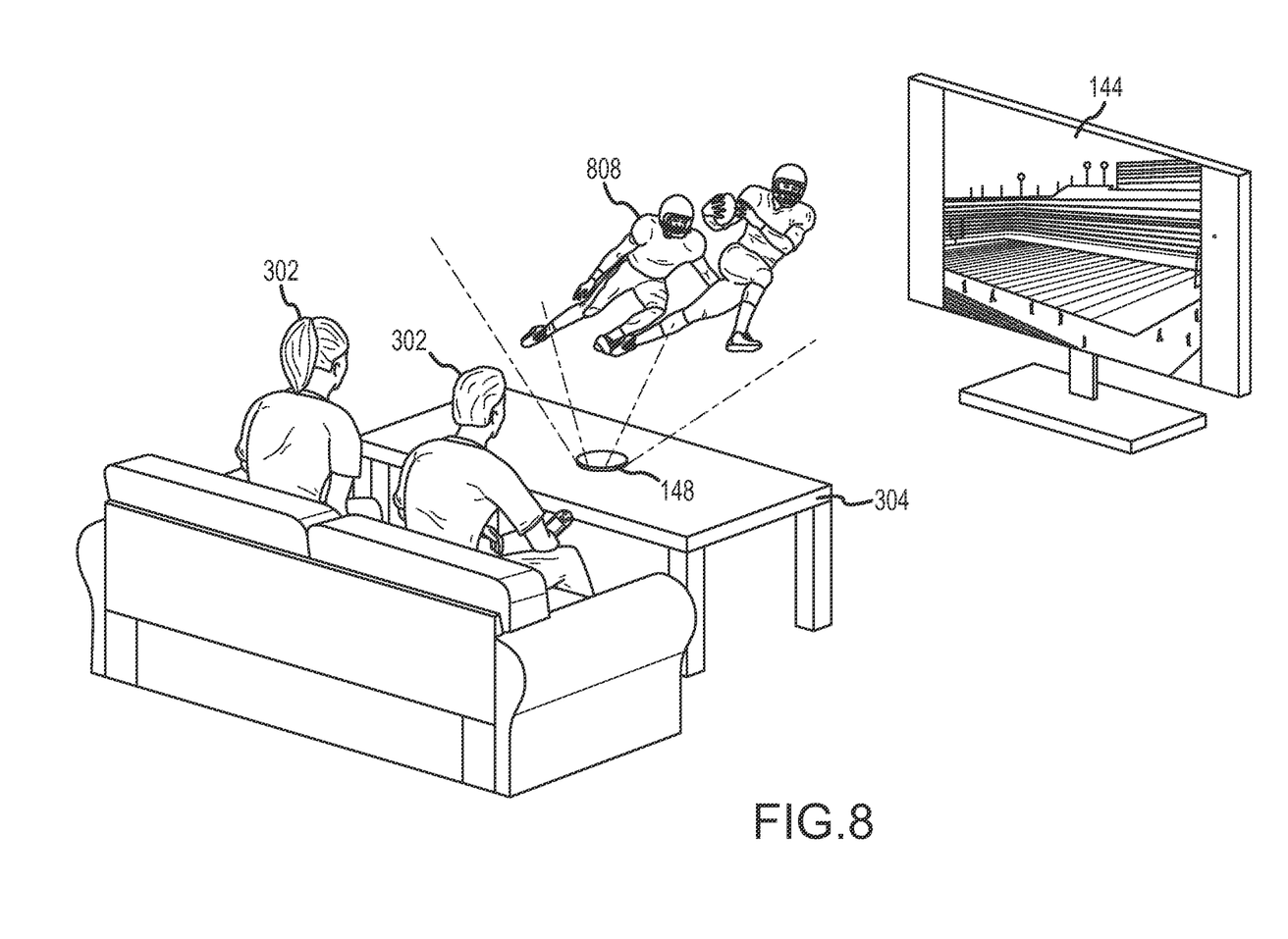
FIG. 8 is an illustration another holographic projection in accordance with the method illustrated in FIG. 6.

In other embodiments, a supplemental video may be provided in connection with a broadcast or other real-time transmission of a program. Such a supplemental video is shown in FIG. 8. As shown in FIG. 8, the users 308 are enjoying a football game that is displayed on display device 144. At specific times, during the broadcast of the football game, the service provider 108 may additionally transmit supplemental video or images (808) that can be displayed through the operation of the holographic projector 148. The holographic image in one instance may be an instant replay of a football game that may be referenced by the commentators of the football game. The holographic projection of an instant replay may be available only to premium subscribers to the service provider and so on.

While embodiments are discussed herein in connection with the exemplary satellite broadcast system shown in FIG. 1, it should be appreciated that embodiments may be used in connection other types of networks or content delivery mechanisms. Generally, the disclosure includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2, FIG. 4 and FIG. 6, described herein is by way of example and limitation. Certain implementations may reorder method operations without departing from the spirit and scope of the disclosure.

The invention claimed is:

1. A method for providing an electronic programming guide, comprising:
   receiving a program service transmission at a receiver, the program service transmission having a plurality of channels;
   outputting at least one channel of the plurality of channels from the receiver for display on a display device; and
   concurrently with the display of the at least one channel, outputting a holographic image of an electronic programming guide, the holographic image including at least a first menu and a second menu;
   wherein the holographic image is a multisided geometric form having a cuboid shape, the first menu being displayed on a first side of the geometric form and the second menu being displayed on a second side of the geometric form, and wherein the first menu is a personalized menu for a first user, the second menu is a personalized menu for a second user, and the holographic image is configured to be manipulated such that the first user and the second user may simultaneously view, respectively, the first menu and second menu; and
   wherein the holographic image is configured to be manipulated such that the first user and the second user may simultaneously view, respectively, the first menu and second menu, and the effect of manipulation of the holographic image by the first user is independent of the effect of manipulation of the holographic image by the second user.

2. The method for providing an electronic programming guide of claim 1, further comprising:
   rotating the multisided geometric form in response to user input.

3. A system for displaying a holographic image, comprising:
   a signal receiver configured to receive a program service transmission, the program service transmission having a plurality of channels;
   an output section connected to the signal receiver, the output section configured to output a signal having at least one channel of the plurality of channels from the program service transmission for display on a display device, the at least one channel including a program; and
   a holographic projector connected to the output section, the holographic projector configured to output a holographic image including an electronic programming guide in combination with the program, wherein the holographic image is a multisided geometric form having a cuboid shape, and wherein a first menu is displayed on a first side of the geometric form, and a second menu is displayed on a second side of the geometric form, and wherein the first menu is a personalized menu for a first user, the second menu is a personalized menu for a second user, and the holographic image is configured to be manipulated such that the first user and the second user may simultaneously view, respectively, the first menu and second menu; and
   wherein the holographic image is configured to be manipulated such that the first user and the second user may simultaneously view, respectively, the first menu and second menu, and the effect of manipulation of the holographic image by the first user is independent of the effect of manipulation of the holographic image by the second user.

4. A system for displaying a holographic image of claim 3, further comprising:
   a body that contains at least the receiver, the output section, and the holographic projector.

5. A system for displaying a holographic image 3, comprising:
   a memory configured to store files that may be recalled to display holographic images in response to user input.

* * * * *